Patented Sept. 1, 1936

2,053,146

UNITED STATES PATENT OFFICE 2,053,146

REFRACTORY

Frederic A. Harvey and John S. McDowell, Pittsburgh, Pa., assignors to Harbison-Walker Refractories Company, Pittsburgh, Pa., a corporation of Pennsylvania No Drawing. Application April 21, 1933, Serial No. 667,231

5 Claims. (Cl. 25—156)

This invention relates to chrome ore refractories.

Chrome ore refractories have been used for many years because of certain characteristics which make them valuable for certain industrial applications. For example, chrome refractories are substantially neutral in action when exposed to either basic or acid slags. Also, chrome ore is one of the more refractory of the common refractory materials.

However, certain disadvantages have militated against the chrome refractories known prior to our invention. For instance, they have been characterized by relatively low softening temperatures, so that their usefulness has been limited to temperatures substantially below the melting point of chrome ore. In consequence it has been necessary also to restrict the loads applied to the refractories. In addition, the chrome refractories known prior to our invention exhibited an appreciable volume shrinkage upon reheating, and they have been subject to spalling upon thermal shock. As far as we are aware it has been the belief in the art that these disadvantages are inherent in refractories made from chrome ore.

It is among the objects of this invention to provide a method of treating chrome ore, and of preparing chrome refractories, which is readily practiced, provides chrome ore refractories capable of successfully withstanding more severe furnace conditions for longer periods of time, under heavier loading, and at higher temperatures, than the chrome ore refractories previously known, and at substantially no added cost, reduces the tendency of the refractories to spall under thermal shock, and eliminates or minimizes service shrinkage.

The invention is predicated upon our discovery that the addition to chrome ore of magnesia in a finely divided form substantially raises the softening temperature of refractories made from such mixtures, permits their use at materially higher temperatures and loads than have been possible heretofore with chrome refractories, and represses other disadvantageous features.

In the practice of the invention the chrome ore is intimately mixed with finely divided high-magnesia material in an amount such that refractories formed from the batch possess a substantially increased softening temperature, as compared with refractories made from the chrome ore without the addition of magnesia. Our tests have shown that the addition of as little as 5 per cent of magnesia produces beneficial results, although more satisfactory results are obtained with greater additions, e. g., up to 30 per cent.

The term "high-magnesia material" is used herein to designate materials consisting essentially of or having a high content of magnesium oxide, such as dead burned magnesite, or other commercial forms of magnesia. It includes also materials which during the process of firing the refractory become converted into concentrated forms of magnesium oxide, such, for instance, as magnesium hydroxide, caustic magnesite, crude magnesite, and similar highly magnesian materials. Other materials having a high magnesia equivalency are also susceptible of use in the practice of the invention, such as magnesium chloride and mixtures containing it, which in the presence of water and under the influence of heat become converted to magnesia. The range of the MgO addition referred to hereinabove refers to the amount of MgO added. Where the material used is not 100 per cent MgO, as in the case of all commercial magnesites, it is used in such amount as to give the desired proportion of MgO.

The benefits of the invention are dependent in large part upon fine subdivision of the high-magnesia material, and we have found that satisfactory results are not obtained if the magnesia material is in a relatively coarse state. The high-magnesia material should be at least fine enough to substantially completely pass a 40-mesh screen (0.014 inch square opening), and preferably it should substantially completely pass a 70-mesh sieve (0.0058 inch square opening). Still finer subdivision of the material may be beneficial, as it seems to improve or to accelerate the obtaining of the result. To this end magnesia produced by chemical procedures, as contrasted with that produced by physical processes, for example, by burning of magnesite, provides the additional agent in a particularly finely divided form. Such chemically produced magnesia may be made by precipitating magnesium hydroxide and calcining it.

Most suitably the chrome ore is used in a relatively coarse condition, for example, ground to pass a 4-mesh screen (0.185 inch square opening). The chrome ore and the high-magnesia material, separately reduced to suitable stages of subdivision, are intimately mixed in any suitable mixer. It is desirable usually to add a certain amount of water during the mixing, for which reason the ordinary wet pan is appropriate. The batch so prepared is formed by any convenient method, and it is then dried and burned.

Refractory brick made in this manner have been found by actual tests to withstand heavier loads at much higher temperatures than brick made from 100 per cent of the same chrome ore. Other improvements of material importance are shown by a decreased tendency to spall under thermal shock, and a virtual elimination of service shrinkage.

These benefits may be understood more clearly from the following actual tests, in which the best quality of chrome ore brick available prior to our invention (Type A) were compared with brick made from a chrome ore containing 32.7 per cent of $Cr_2O_3$, 14.5 per cent of FeO, 17.8 per cent of MgO, 29.5 per cent of $Al_2O_3$, and about 5.5 per cent of other constituents. The ore was ground to pass a 4-mesh screen. Type B brick were made from 100 per cent of this ore.

Brick illustrative of the invention (Type C) were also made from the ore, using a dead burned magnesite containing about 93 per cent of MgO and ground to pass a 70-mesh screen. The batch was made from 85 per cent of the chrome ore and 15 per cent of the burned and ground magnesite, and it was mixed in an ordinary wet pan, with about 5.5 per cent of water. The brick were then pressed from the batch, and they were then dried in a kiln during about twenty-four hours at a maximum temperature of about 149° C. Thereafter the brick were burned to a temperature of about 1427° C.

Tht brick were then tested, and the following results were obtained:

| | Type "A" | Type "B" | Type "C" |
|---|---|---|---|
| Maximum temperature at which a brick 9" x 4.5" x 2.5" will support a load of 25 lbs./sq. in. placed on its end. | 1393° C. | 1288° C. | 1560° C. |
| Volume shrinkage when brick are reheated for five hours at 2912° F. | 2.0% | 3.0% | 0.0% |
| Loss in weight by spalling when panel of brick is cooled by an air blast from 2000° F. (repeated 10 times). | 2.3% | 7.2% | 0.0% |

The results show that by the invention the softening temperature has been increased 150° C. (300° F.) above that of the best chrome brick (Type A) previously available, and approximately 260° C. (500° F.) above that of an ordinary (Type B) chrome brick made from the same ore without the use of magnesia. This means increased load capability, not only at the temperatures at which prior chrome refractories could be used safely, but also at temperatures beyond those heretofore possible with such brick. The data show clearly also that the volumetric shrinkage has been eliminated, while it was substantial in the ordinary commercial types of chrome brick, which is of importance, since shrinkage acts to open joints with objectionable consequences. Likewise spalling, as measured by the test used, has been eliminated, which indicates an increase in useful life of the brick.

We now believe that the disadvantages encountered heretofore have been due to the presence in the ore of silicate impurities of low melting point, and that the benefits of the invention result from the conversion of those impurities, by reaction with the magnesia, to silicate materials which melt at much higher temperatures. Thus natural chrome ore may contain various magnesium silicates of low refractoriness, examples being penninite, talc, and serpentine, all of which melt, in whole or in substantial part at relatively low temperatures, especially when in the form of mixtures and in the presence of such impurities as calcium and iron oxides, which may materially lower the melting and softening temperatures.

One reason for this belief is that our tests show the best results are obtained by adding sufficient MgO to bring the total MgO content of the silicate impurities in the batch to 57 per cent, which corresponds to forsterite, whose melting point is about 1850° C. and therefore very materially above that of the natural impurities.

Whether or not this action occurs, or whether the impurities be converted wholly or only in part to higher melting compounds, the refractoriness of chrome ores is materially increased by the practice of the invention. And while the magnesia material may be used in the range indicated hereinabove as suitable, this theory provides a means for readily ascertaining the exact amount of high-magnesia material that must be added to a given ore to produce the desired increase in refractoriness. Thus, knowing the content of $SiO_2$ and MgO in the ore there is given a direct measure of the amount of MgO which must be added to convert the natural impurities to a form containing 57 per cent of MgO. In general it is desirable to add a certain excess of magnesia over the amount calculated to be necessary, to insure that the softening point of the refractory is improved sufficiently. This is desirable in any event, as compositions richer in MgO than forsterite have progressively higher melting points, approaching that of pure magnesia.

In such processes as these, involving a chemical reaction, it may be advantageous to add a mineralizer, or catalyst, to assist in effecting the reaction. To this end there may be added to the batch small amounts of a mineralizer, e. g., borax, fluorspar, cryolite, boric oxide, and others known to those skilled in the art.

Our present conception of the process involved, as just stated, is that the improvement results from the formation of forsterite. It may be desirable, therefore, to "seed" the batch, so as to further the conversion of the silicate impurities to forsterite, or to render the conversion more rapid, or more complete. For this purpose there may be added to the batch minor amounts of crystalline forsterite, either artificial or natural. This material occurs rarely in a pure state naturally but pure olivines contain it, and these may be used. For instance, crystals of olivine, carefully selected to keep the content of magnesia sufficiently high, may be added in an amount preferably not exceeding 5 per cent of the batch. These forsterite crystals then serve as nuclei for the formation of this material from the silicate impurities in the ore and the added magnesia.

In some instances the normal burning period may be thought to be insufficient to allow the desired reaction to become sufficiently completed. This may be compensated for by giving part or all of the batch a preliminary calcining treatment, high-magnesia material being intimately mixed with it prior to the heating. Material treated in this manner receives two burnings, one in the preliminary calcining, and the second after suitable grinding, mixing, and molding into shapes. If necessary or desirable further magnesia may be added to the ground pre-calcined material in preparing the batch for molding.

Some chrome ores may contain natural impurities in a form not readily responsive to the addition of dry magnesia material. In such instances the magnesia material may be added in a form adapted to penetrate into the chromite grains and reach the more or less inaccessible silicate impurities held in crevices in the ore grains, for instance by adding it as a slip or slurry in water. Or preferably, a solution of a soluble magnesium compound, e. g., magnesium chloride, may be used for this purpose, the solution penetrating into the ore particles and chloride being thereby deposited in intimate contact with the impurities for effecting its desired result.

Many chrome ore-magnesia batches used in the practice of the invention tend to expand somewhat during burning. Usually this will not be objectionable, but it tends to increase the porosity of the brick to a somewhat higher value than would be the case with brick made from 100 per cent of chrome ore. For this reason it will usually be desirable to form the brick, or other shapes, under very high pressures, and to take other steps known to those skilled in the art for producing suitable density and sufficiently low porosity. Thus the brick may be formed under pressures of 1000 pounds per square inch, or higher, as occasion may demand. Also, it may be of value in some instances to use raw materials in sizes of grains which will produce dense packing.

It is not necessary for the batches prepared in accordance with the invention to be formed into shapes or to be fired prior to use. For instance, the mixed batch may be used for forming linings or the like which are burned in place. Or, brick may be formed and dried, laid up into the desired structure, and burned in service. In the case of brick shipped in a dried but unburned condition it will usually be desirable to use a bonding material in the batch, such as an organic bonding agent. Experience has shown that for such bonding purposes magnesium chloride acts suitably with refractory mixes, and thus magnesium chloride might be used for the dual purpose of supplying, in whole or in part, the magnesia necessary for the purposes of the invention, and also to confer sufficient strength to the dried brick to permit them to be shipped.

According to the provisions of the patent statutes, we have explained the principle of our invention and have described what we now consider to represent its best embodiment. However, we desire to have it understood that, within the scope of the appended claims, the invention may be practiced otherwise than as specifically illustrated and described.

We claim:

1. The method of making a chrome ore refractory, comprising intimately mixing relatively coarse chrome ore with high-magnesia material in an amount corresponding to from about 5 per cent to about 30 percent of MgO, said high-magnesia material being finely divided to substantially completely pass a 70-mesh screen, adding a mineralizer in minor amount to the batch, molding the batch, drying the molded shapes, and firing them, and thereby forming a refractory characterized by high softening point, substantial freedom from spalling under thermal shock, and low service shrinkage.

2. The method of making a chrome ore refractory, comprising intimately mixing chrome ore ground to pass about a 4-mesh screen with high-magnesia material in an amount corresponding to from about 5 per cent to about 30 per cent of MgO, said high-magnesia material being finely divided to substantially completely pass a 70-mesh screen, adding a minor amount of a mineralizer, molding under high pressure, drying the molded shapes, and firing them, and thereby forming a refractory characterized by high softening point, substantial freedom from spalling under thermal shock, and substantial absence of service shrinkage.

3. The method of making a chrome ore refractory, comprising intimately mixing chrome ore with a high-magnesia material in an amount such as to bring the MgO content of the silicate impurities to at least 57 per cent, said high-magnesia material being finely divided to pass a 70-mesh screen, adding a minor proportion of material containing forsterite to the batch, molding the batch, drying the molded shapes, and firing them, and thereby forming a refractory characterized by high softening point, substantial freedom from spalling under thermal shock, and substantial absence of service shrinkage.

4. The method of making a chrome ore refractory, comprising intimately mixing relatively coarse chrome ore with high-magnesia material in an amount corresponding to from about 5 per cent to about 30 per cent of MgO, said high-magnesia material being finely divided and consisting at least in part of magnesium chloride, molding the mix to form shapes, and drying the formed shapes, said chloride acting to bond the dried article and upon firing causing it to assume an increased softening point and decreased tendency toward spalling as compared with a similar article not containing added magnesium compound.

5. The method of making a chrome ore refractory comprising intimately mixing chrome ore with a high-magnesia material in an amount such that the MgO content of the silicate impurities is at least 57 per cent, said high-magnesia material being finely divided to pass a 70-mesh screen, adding a minor proportion of a mineralizer to the batch, molding the mix under high pressure, drying the molded shapes, and firing them, and thereby forming a refractory characterized by high softening point, substantial freedom from spalling under thermal shock, and substantial absence of surface shrinkage.

FREDERIC A. HARVEY.
JOHN S. McDOWELL.